(12) United States Patent
Tustanowski et al.

(10) Patent No.: US 7,529,606 B2
(45) Date of Patent: May 5, 2009

(54) FUEL CUTOFF ALGORITHM

(75) Inventors: Rachelle Tustanowski, Livonia, MI (US); Todd Clark, Dearborn, MI (US); David Tippy, Ann Arbor, MI (US); Yeruva Reddy, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 11/276,330

(22) Filed: Feb. 24, 2006

(65) Prior Publication Data

US 2007/0203615 A1    Aug. 30, 2007

(51) Int. Cl.
*B60K 28/14*    (2006.01)

(52) U.S. Cl. .......................... 701/45; 180/284

(58) Field of Classification Search .................. None
See application file for complete search history.

(56) References Cited

U.S. PATENT DOCUMENTS

| | | | |
|---|---|---|---|
| 5,825,098 A * | 10/1998 | Darby et al. | 307/10.1 |
| 6,170,864 B1 * | 1/2001 | Fujita et al. | 280/735 |
| 6,640,174 B2 | 10/2003 | Schondorf et al. | |
| 6,766,234 B2 * | 7/2004 | Takagi et al. | 701/45 |
| 6,766,235 B2 * | 7/2004 | Frimberger et al. | 701/45 |
| 7,055,640 B2 * | 6/2006 | Cook | 180/284 |
| 2002/0135168 A1 * | 9/2002 | Mattes et al. | 280/735 |

* cited by examiner

*Primary Examiner*—Michael J. Zanelli
(74) *Attorney, Agent, or Firm*—O'Brien Jones, PLLC

(57) ABSTRACT

An algorithm for use with a restraint control module that controls a signal output to a vehicle fuel pump. The algorithm deploys a fuel cutoff signal when crash sensors sense a vehicle crash condition that meets or exceeds a fuel cutoff threshold employed by the algorithm. The fuel cutoff threshold is generally elliptical.

20 Claims, 5 Drawing Sheets

FUEL CUTOFF ALGORITHM

BACKGROUND OF THE INVENTION

1. Field of Invention

This invention relates to the field of controlling vehicle fuel delivery. More specifically, this invention relates to controlling vehicle fuel delivery using an algorithm that provides a more robust control of fuel cutoff thresholds.

2. Background

Currently, vehicles use electronic controls for many functions, including restraint systems. For example, restraint control modules are used to control air bag deployment in the event of a collision. Restraint control modules are typically powered by the vehicle battery and may contain a backup power supply system.

It is known to use a separate electromechanical fuel flow cutoff switch to stop operation of a vehicle's fuel pump in the instance of an impact. The fuel flow cutoff switch is intended to prevent continuous flow of fuel by disabling the fuel pump. Fuel flow cutoff switches are generally located in the rear portion of the vehicle. Using a separate electromechanical fuel flow cutoff switch can be disadvantageous because it adds cost to the vehicle, and provides only a single threshold for determining whether the vehicle's fuel system should be disabled. Also, it can be difficult to find a suitable location to mount the switch.

Restraint control modules typically include a microprocessor and constantly monitor data received from sensors, such as accelerometers, radar sensors, and ultrasonic sensors that provide data to the microprocessor and assist in identifying crash severity. Upon receiving data from the sensors that is potentially indicative of a collision event, the restraint control module compares the data being received to stored collision data profiles to determine whether a collision has occurred. Upon determining that the collision data corresponds to a collision of a predetermined magnitude, the restraint control module can deploy vehicle restraint systems.

BRIEF SUMMARY OF THE INVENTION

In one embodiment, the invention is directed to an algorithm for use with a restraint control module that controls a signal output to a vehicle fuel pump. The algorithm deploys a fuel cutoff signal when crash sensors sense a vehicle crash condition that meets or exceeds a fuel cutoff threshold employed by the algorithm. The fuel cutoff threshold is generally elliptical.

In another embodiment, the invention is directed to a fuel cutoff system comprising crash sensors, a restraint control module that receives data from the crash sensors, and an algorithm used by the restraint control module to deploy a fuel cutoff signal when the crash sensors sense a vehicle crash condition that meets or exceeds a fuel cutoff threshold employed by the algorithm. The fuel cutoff threshold is generally elliptical.

In yet another embodiment, the invention is directed to a method for controlling a signal output to a vehicle fuel pump. The method comprises providing an algorithm for a restraint control module in the vehicle, the algorithm deploying a fuel cutoff signal when crash sensors sense a vehicle crash condition that meets or exceeds a fuel cutoff threshold employed by the algorithm. The fuel cutoff threshold is generally elliptical.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

It has been proposed that a restraint control module be used to control a signal output to a vehicle's fuel system, thus eliminating the need for a separate electromechanical fuel system control switch.

The present invention includes an algorithm for use with a restraint control module receiving data from crash sensors, such as X and Y accelerometers. The restraint control module, utilizing the algorithm, can deploy a fuel cutoff signal when a fuel cutoff threshold has been met. The restraint control module utilizes the algorithm to analyze input from the crash sensors to determine: (1) severity of impact; (2) need for and timing of fuel cutoff signal deployment; (3) level of fuel cutoff that has occurred; and (4) level of safing from a redundant sensor. The algorithm itself can be used for a variety of vehicles, and preferably includes variables, as discussed below, that are calibrated to optimize fuel cutoff precision for each vehicle.

The restraint control module may be a centralized or "center tunnel" unit containing both X and Y sensors; however, the X and Y sensors need not be centralized. The algorithm preferably utilizes data from at least one redundant sensor for safing.

The fuel cutoff threshold for the algorithm of the present invention is generally elliptical, but need not be symmetrical about the X-axis or the Y-axis, which allows different thresholds to be set for fuel cutoff for front and rear collisions, and also for side collisions. In addition, depending on the location of the vehicle's fuel line, the threshold for the driver and passenger sides may be different. For example, if the vehicle's fuel line runs down the passenger side, the present invention allows variables in the algorithm to be set or defined such that there is a lower impact threshold for the passenger side of the vehicle, because the fuel should be cut off for a lower level impact on the passenger's side than the driver's side due to the proximity of the fuel line.

Because the algorithm is generally elliptical, it employs the traditional equation for an ellipse, substituting the appropriate X- and Y-velocity variables:

$$\frac{X^2}{a^2} + \frac{Y^2}{b^2} = 1$$

The algorithm of the present invention preferably employs a fuel cutoff look-up table defined for each of the four quadrants of the vehicle using the elliptical threshold, as described below and illustrated in the flowchart of FIG. 2. The lookup table may reduce the amount of microprocessor resources utilized in the restraint control module for determining fuel cutoff.

Figure 1:
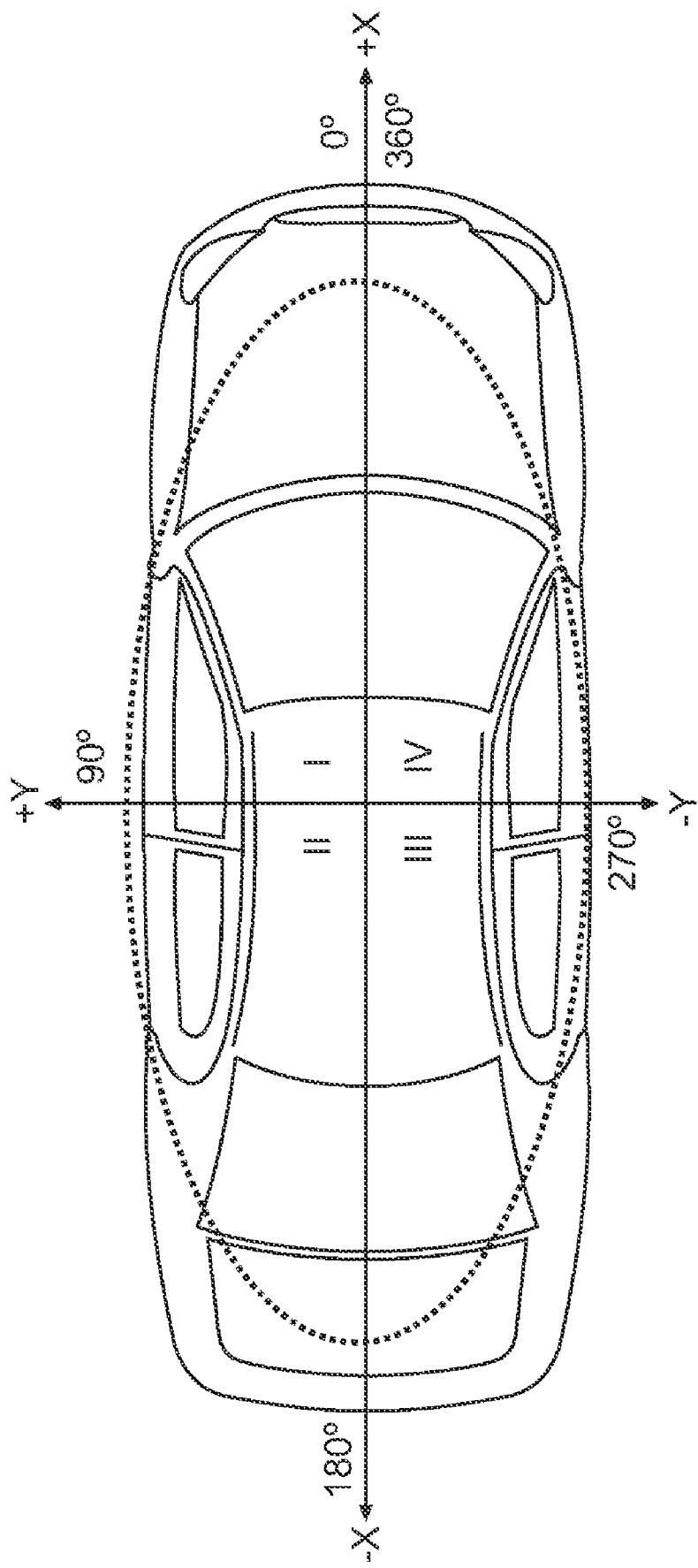
FIG. 1 illustrates a vehicle and four vehicle crash quadrants.

FIG. 1 illustrates the four exemplary vehicle crash quadrants that are relevant to this invention. X- and Y-axes extend through the vehicle. As can be seen, Quadrant I includes the front driver's side and has positive X coordinates and positive Y coordinates. The range of impact angles within Quadrant I are $\theta=0°$ to $90°$. Quadrant II includes the rear driver's side and has negative X coordinates and positive Y coordinates. The range of impact angles within Quadrant II are $\theta=90°$ to $180°$. Quadrant III includes the rear passenger's side and has negative X coordinates and negative Y coordinates. The range of impact angles within Quadrant III are $\theta=180°$ to $270°$. Quadrant IV includes the front passenger's side and has positive X coordinates and negative Y coordinates. The range of impact angles within Quadrant IV are $\theta=270°$ to $360°$.

The X coordinate represents a change in vehicle velocity along its longitudinal axis. A change in vehicle velocity along its longitudinal axis is designated herein as Vx and occurs, for example, as a result of front and rear impacts. A change in vehicle velocity along the vehicle's longitudinal axis may also occur as a result of offset impacts. The Y coordinate represents a change in vehicle velocity along its lateral axis. A change in vehicle velocity along its lateral axis is designated herein as Vy and occurs, for example, as a result of a side impact. A change in vehicle velocity along its lateral axis may also occur as a result of offset impacts.

The dashed line in FIG. 1 is an exemplary elliptical fuel cutoff threshold. The illustrated elliptical fuel cutoff threshold indicates that fuel cutoff would occur at higher impact velocity changes for front and rear impacts than for side impacts. The longitudinal and lateral velocity changes that trigger fuel cutoff can vary by vehicle, causing the shape and size of the ellipse to vary. The ellipse could even be circular if it was desirable to have fuel cutoff occur at the same velocity changes for front, rear, and side impacts.

Figure 2:
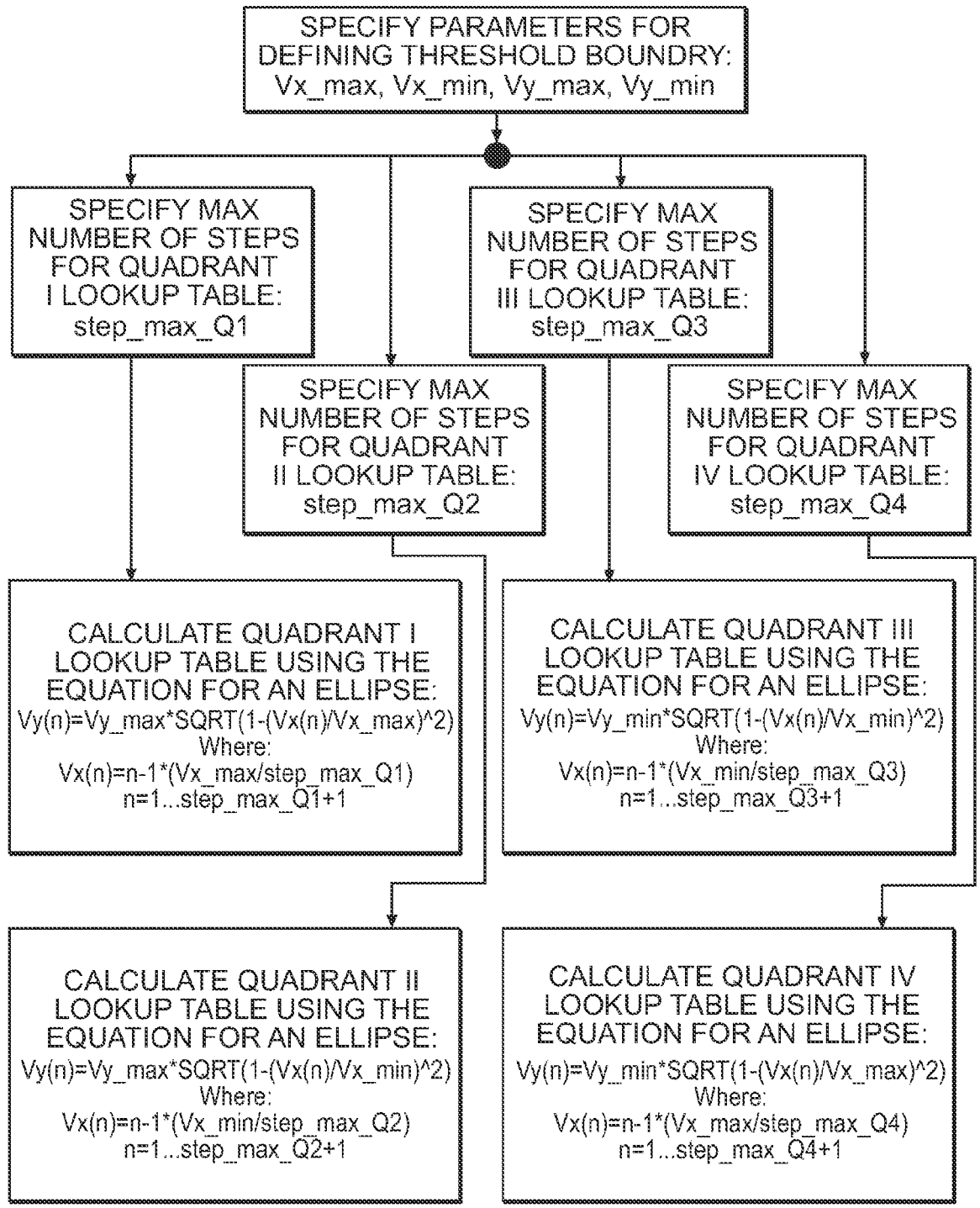
FIG. 2 illustrates a method for populating lookup tables to be used in the fuel cutoff algorithm of the present invention.

FIG. 2 is a flowchart illustrating a method for populating lookup tables that can be used in the fuel cutoff algorithm to reduce restraint control module resource utilization. A separate lookup table is preferably created for each of Quadrants I through IV. The variables used to populate the lookup tables, such as maximum and minimum velocity change and maximum number of steps, vary for different vehicles and are preferably set or defined during calibration and determined through known crash testing techniques. First, the minimum and maximum changes in velocity in the X and Y directions (Vx_max, Vx_min, Vy_max, and Vy_min) are defined. Next, the maximum number of steps is defined for each quadrant's lookup table (step_max Q1, step_max_Q2, step_max_Q3, and step_max_Q4). After defining the appropriate parameters, a lookup table for each quadrant is calculated using the equation for an ellipse as illustrated.

Figure 4:
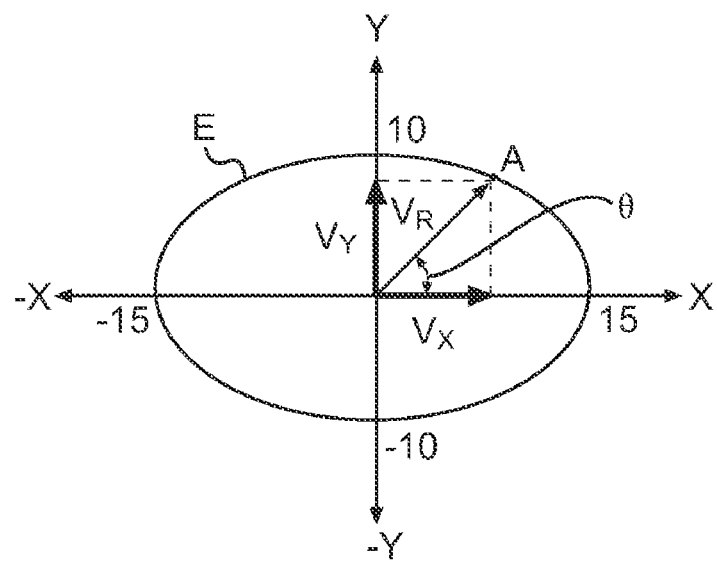
FIG. 4 illustrates an embodiment of a theoretical method used to determine impact magnitude based on change in vehicle velocity.
Figure 5:
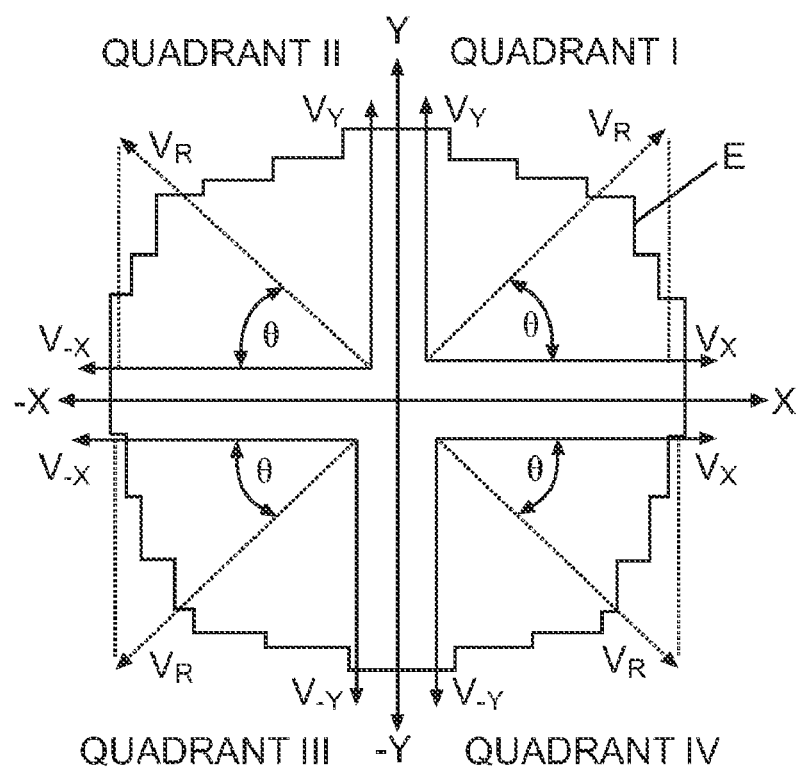
FIG. 5 illustrates an alternate embodiment of a theoretical method used to determine impact magnitude based on change in vehicle velocity.

Different theoretical methods, for example those illustrated and explained with respect to FIGS. 4 and 5, can be used as a basis for populating the lookup tables.

Once the table for each quadrant has been generated, the threshold change in velocity in the Y-direction for a corresponding change in velocity in the X-direction (Vy[Vx]) can be obtained using Vx in the lookup table for the appropriate quadrant. Each change in velocity in the X-direction (Vx) has a corresponding Vy threshold value, denoted Vy[Vx] for a given quadrant. Generally, as is characteristic of an ellipse, the great the value of Vx, the lesser the corresponding Vy threshold value will be.

Regarding the maximum number of steps for each quadrant's lookup table (step_max_Q1, step_max_Q2, step_max_Q3, and step_max_Q4), a greater number of steps creates finer steps in the elliptical threshold and therefore a higher resolution. However, a greater number of steps creates larger lookup tables and therefore utilizes more resources of the restraint control module. Because the fuel cutoff algorithm of the present invention is reactive (as opposed to restraint deployment which is predictive), finer steps are not generally needed. Therefore, the present invention preferably employs finer steps only when needed for a particular vehicle to detect a crash mode that would otherwise go undetected.

Figure 3:
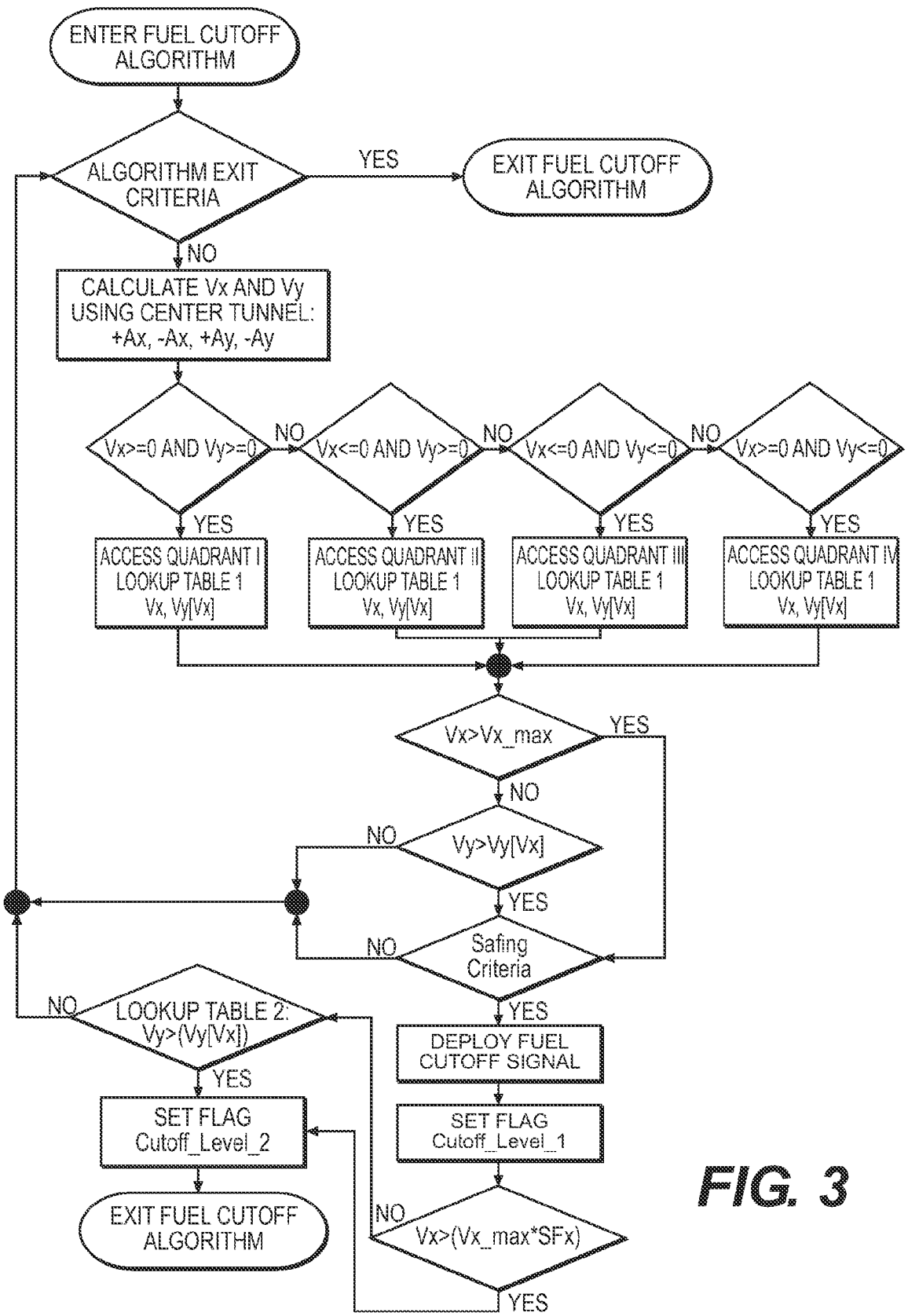
FIG. 3 is a flowchart illustrating logic for an embodiment of the fuel cutoff algorithm of the invention.

FIG. 3 is a flowchart illustrating logic for an embodiment of the fuel cutoff algorithm of the invention. The entry criteria for the algorithm are based on known standards and may be determined by the supplier. Upon entering the fuel cutoff algorithm, the restraint control module calculates the change in velocity Vx along the vehicle's longitudinal axis using the output +Ax or −Ax of sensors, such as accelerometers, that are preferably located at the vehicle's center tunnel. The restraint control module also calculates the change in velocity Vy along the vehicle's lateral axis using the output +Ay or −Ay of sensors, such as accelerometers, that are also preferably located at the vehicle's center tunnel.

After calculating Vx and Vy, the algorithm then checks whether Vx>=0 and Vy>=0. If so, the algorithm accesses the Quadrant I Lookup Table 1. If not, and Vx<=0 and Vy>=0, the algorithm accesses the Quadrant II Lookup Table 1. If Vx<=0 and Vy<=0, the algorithm accesses the Quadrant III Lookup Table 1. If Vx>=0 and Vy<=0, the algorithm accesses the Quadrant IV Lookup Table 1.

Upon accessing the appropriate lookup table, the algorithm determines whether Vx is greater than the calibrated threshold value Vx_max. If so, the algorithm checks a safing sensor to verify the Vx data. The safing sensor is preferably located remotely or decoupled from the sensor used for the initial Vx reading. The safing sensor must verify the Vx data before the algorithm proceeds.

If Vx is not greater than the threshold value Vx_max, the algorithm references the threshold value Vy[Vx] from the appropriate lookup table and checks whether Vy is greater than Vy[Vx]. If so, the algorithm checks a safing sensor to verify the Vy data. The safing sensor must verify the Vy data before the algorithm proceeds.

The algorithm preferably employs two levels of fuel cutoff. The first level (Cutoff_Level_1) is typically a resettable threshold and the second level (Cutoff_Level_2) may or may not be a resettable threshold. In some instances, the second level may employ a more complicated reset method than the first level. If Vx or Vy have exceeded the respective threshold values, and safing has confirmed their values, the restraint control module deploys a fuel cutoff signal and sets a flag for Cutoff_Level_1. After setting the Cutoff_Level_1 flag, the algorithm checks whether Vx is greater than Vx_max*SFx. SFx and SFy are scaling factors that are applied to the calculated elliptical cutoff threshold values of level one to get an elliptical level two cutoff threshold stored as Lookup Table 2. SFx and SFy may be, for example, 1.2 or 1.4 and are preferably calibrated for each vehicle. If Vx is not greater than Vx_max*SFx, the algorithm references Lookup Table 2 and checks whether Vy>Vy[Vx]. If Vy is not greater than Vy[Vx]

in Lookup table 2, then it is not necessary to elevate the fuel cutoff to its second level, and the algorithm returns to check whether the algorithm exit criteria have been met. If the algorithm exit criteria have been met, the fuel cutoff algorithm is terminated. If not, Vx and Vy are again calculated and compared to lookup table values. If Vx is greater than Vx_max*SFx, the algorithm sets a flag for Cutoff_Level_2 and the fuel cutoff algorithm is terminated.

FIG. 4 illustrates an embodiment of a theoretical method used to determine impact magnitude based on change in vehicle velocity Vx and Vy, and to determine whether the impact magnitude meets or exceeds the threshold for fuel cutoff. This theoretical method can be performed by the algorithm during vehicle operation, or can be used in populating lookup tables that are accessed by the algorithm during vehicle operation, as discussed above. As shown, the elliptical fuel cutoff threshold E has X coordinates of +15, −15, and has Y coordinates of +10, −10. After calculating the vehicle's change in velocity Vx along its longitudinal axis and velocity Vy along its lateral axis, using crash sensors as described above, the magnitude of the resultant vector $V_R$ is calculated using the equation:

$$V_R = \sqrt{V_X^2 + V_Y^2}$$

Then, using the constructed function aTan2, the angle of impact $\theta$ is calculated as follows:

$$\theta = a\mathrm{Tan2}(V_X, V_Y)$$

Where aTan2 is a known constructed function that incorporates quadrant information to maintain the proper sign. As an example, if Vx=5 and Vy=5, according to the above equations, the resultant vector is $V_R$=7.07 and angle of impact is $\theta$=45°.

For given X and Y ellipse coordinates, an ellipse in polar coordinates is defined by the following equation:

$$A(\theta) = \frac{X^2 + Y^2}{\sqrt{X^2 * \sin(\theta) * \sin(\theta) + Y^2 * \cos(\theta) * \cos(\theta)}}$$

Thus, for the ellipse shown in FIG. 4, where X=15, Y=10, and $\theta$=45°, $A(\theta)$ is calculated to be 11.77. As calculated above, $V_R$=7.07. Therefore, resultant vector $V_R < A$ and the fuel cutoff threshold was not crossed. For the impact illustrated in FIG. 4, the restraint control module would therefore not deploy a fuel cutoff signal.

FIG. 5 illustrates an alternative embodiment of a theoretical method used to determine impact magnitude based on Vx and Vy. This theoretical method can be performed by the algorithm during vehicle operation, or can be used in populating lookup tables. It is the basis for populating the lookup tables as illustrated in FIG. 2. Within Quadrant I, resultant vector $V_R$ is calculated using the equation:

$$V_R = \sqrt{V_X^2 + V_Y^2}$$

Then, angle of impact $\theta$ is determined according to the following series of equations:

$$\mathrm{Sin}(\theta) = \frac{V_Y}{V_R}, \theta = \mathrm{Sin}^{-1}\left(\frac{V_Y}{V_R}\right) \text{ so that}$$

$$\theta = \mathrm{Sin}^{-1}\left(\frac{V_Y}{\sqrt{V_X^2 + V_Y^2}}\right)$$

Similarly, within Quadrant II, resultant vector $V_R$ is calculated using the equation:

$$V_R = \sqrt{V_{-X}^2 + V_Y^2}$$

Then, angle of impact $\theta$ is determined according to the following series of equations:

$$\mathrm{Sin}\,\theta = \frac{V_Y}{V_R}, \theta = \mathrm{Sin}^{-1}\left(\frac{V_Y}{V_R}\right) \text{ so that}$$

$$\theta = \mathrm{Sin}^{-1}\left(\frac{V_Y}{\sqrt{V_{-X}^2 + V_Y^2}}\right)$$

Within Quadrant III, resultant vector $V_R$ is calculated using the equation:

$$V_R = \sqrt{V_{-X}^2 + V_{-Y}^2}$$

And the angle of impact $\theta$ is determined according to the following series of equations:

$$\mathrm{Sin}\,\theta = \frac{V_{-Y}}{V_R}, \theta = \mathrm{Sin}^{-1}\left(\frac{V_{-Y}}{V_R}\right) \text{ so that}$$

$$\theta = \mathrm{Sin}^{-1}\left(\frac{V_{-Y}}{\sqrt{V_{-X}^2 + V_{-Y}^2}}\right)$$

Finally, within Quadrant IV, resultant vector $V_R$ is calculated using the equation:

$$V_R = \sqrt{V_X^2 + V_{-Y}^2}$$

And the angle of impact $\theta$ is determined according to the following series of equations:

$$\mathrm{Sin}\,\theta = \frac{V_{-Y}}{V_R}, \theta = \mathrm{Sin}^{-1}\left(\frac{V_{-Y}}{V_R}\right) \text{ so that}$$

$$\theta = \mathrm{Sin}^{-1}\left(\frac{V_{-Y}}{\sqrt{V_X^2 + V_{-Y}^2}}\right)$$

As can be seen, it is important to maintain the proper sign for Vx and Vy so that the correct angle of impact $\theta$ is calculated. In FIG. 5, when resultant vector $V_R$ crosses the elliptical fuel cutoff threshold E, the restraint control module deploys a fuel cutoff signal as discussed above.

Figure 6:
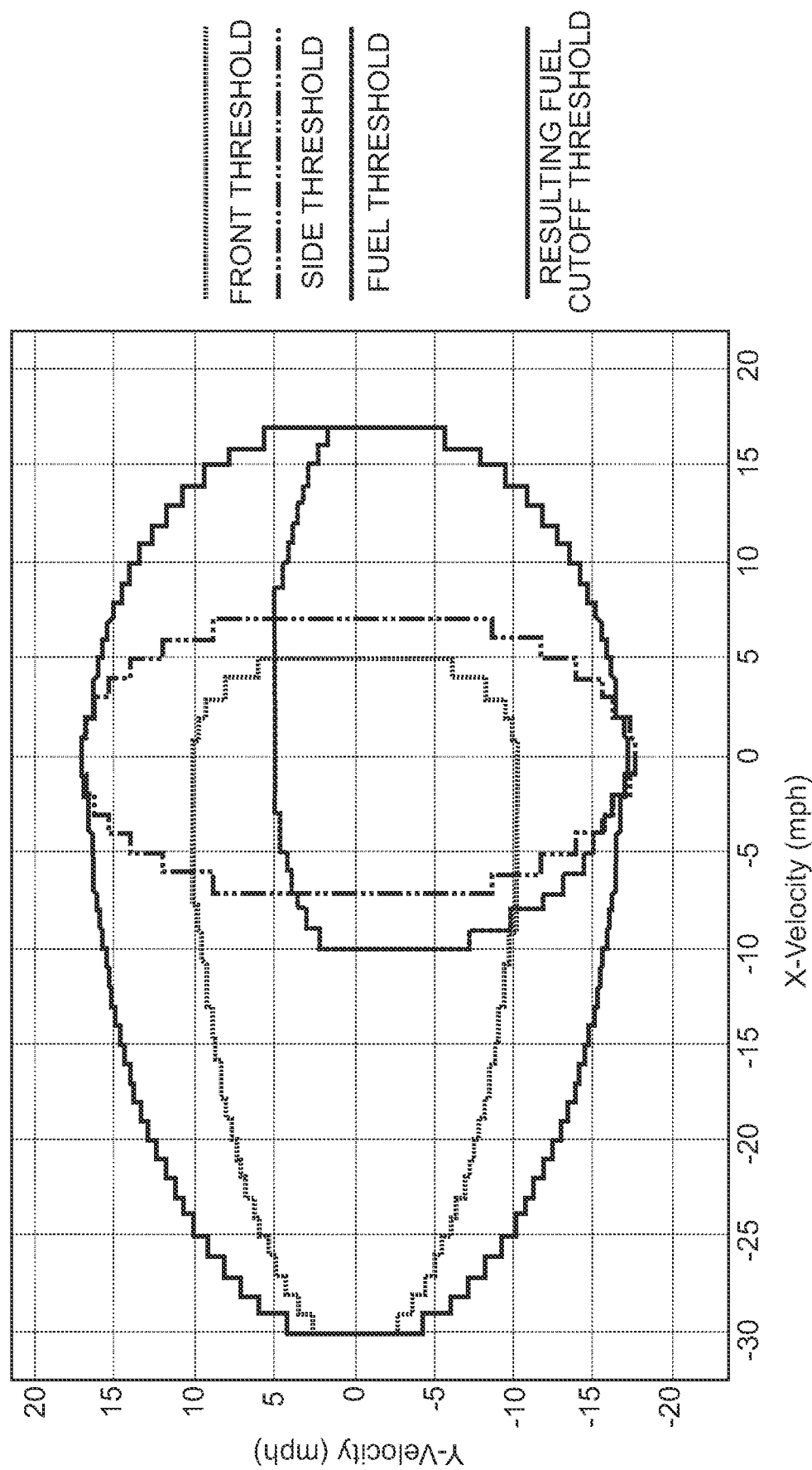
FIG. 6 illustrates a method for determining the coordinates of an elliptical fuel cutoff threshold for use in the fuel cutoff algorithm of the invention.

FIG. 6 illustrates a method for determining the coordinates of an elliptical fuel cutoff threshold in accordance with the present invention. As shown, the elliptical fuel cutoff threshold is made to encompass front, side, and rear impact thresholds very similar to those that normally trigger the restraint control module's deployment of occupant restraints. The front, side, and rear impact thresholds are determined through known testing procedures. The fuel cutoff threshold for rear impacts can be determined, for example, by impact testing using an FMVSS 301 cart for side impact, a rear moving barrier, and a rear offset cart. Once the coordinates of the elliptical fuel cutoff threshold are determined, they are used in the algorithm as set forth above.

The present invention also contemplates a fuel cutoff algorithm that can deploy a fuel cutoff signal, as appropriate, in response to a rollover sensor that is attached to the restraint control module.

What is claimed is:

1. A computer-implemented method for controlling vehicle fuel delivery, the method comprising employing an algorithm for use with a restraint control module that controls a signal output to a vehicle fuel pump, wherein the algorithm deploys a fuel cutoff signal when crash sensors sense a vehicle crash condition that meets or exceeds a fuel cutoff threshold employed by the algorithm, wherein the fuel cutoff threshold is generally elliptical.

2. The method of claim 1, further comprising employing two fuel cutoff thresholds, at least one of which is generally elliptical.

3. The method of claim 2, wherein, when one of the fuel cutoff thresholds is met, the fuel cutoff can be reset.

4. The method of claim 1, further comprising utilizing a lookup table populated based on predetermined minimum and maximum changes in a longitudinal velocity X and a lateral velocity Y of a vehicle, used as input to an equation for an ellipse $$\frac{X^2}{a^2} + \frac{Y^2}{b^2} = 1.$$

5. The method of claim 4, further comprising populating the lookup table based on a predetermined number of steps defining a resolution of the lookup table.

6. The method of claim 5, wherein a greater number of steps can be used to detect certain crash conditions.

7. The method of claim 1, further comprising employing data from a safing sensor to verify that a vehicle crash condition has occurred.

8. A fuel cutoff system, comprising:
 crash sensors;
 a restraint control module that receives data from the crash sensors; and
 an algorithm used by the restraint control module to deploy a fuel cutoff signal when the crash sensors sense a vehicle crash condition that meets or exceeds a fuel cutoff threshold employed by the algorithm,
 wherein the fuel cutoff threshold is generally elliptical.

9. The fuel cutoff system of claim 8, wherein the algorithm utilizes two fuel cutoff thresholds, at least one of which is generally elliptical.

10. The fuel cutoff system of claim 9, wherein, when one of the fuel cutoff thresholds is met the fuel cutoff can be reset.

11. The fuel cutoff system of claim 8, wherein the algorithm utilizes a lookup table populated based on predetermined minimum and maximum changes in a longitudinal velocity X and a lateral velocity Y of a vehicle, used as input to an equation for an ellipse $$\frac{X^2}{a^2} + \frac{Y^2}{b^2} = 1.$$

12. The fuel cutoff system of claim 11, wherein the lookup table is also populated based on a predetermined number of steps defining a resolution of the lookup table.

13. The fuel cutoff system of claim 12, wherein a greater number of steps can be used to detect certain crash conditions.

14. The fuel cutoff system of claim 8, further comprising a safing sensor, and wherein the restraint control module receives data from the safing sensor and the algorithm employs the data from the safing sensor to verify that a vehicle crash condition has occurred.

15. A method for controlling a signal output to a vehicle fuel pump, the method comprising:
 utilizing an algorithm in a restraint control module of the vehicle, the algorithm deploying a fuel cutoff signal when crash sensors sense a vehicle crash condition that meets or exceeds a fuel cutoff threshold employed by the algorithm,
 wherein the fuel cutoff threshold is generally elliptical.

16. The method of claim 15, further comprising deploying a first fuel cutoff signal that is resettable.

17. The method of claim 16, further comprising deploying a second fuel cutoff signal that is not resettable.

18. The method of claim 15, wherein the algorithm accesses a lookup table populated based on predetermined minimum and maximum changes in a longitudinal velocity X and a lateral velocity Y of a vehicle, used as input to an equation for an ellipse $$\frac{X^2}{a^2} + \frac{Y^2}{b^2} = 1.$$

19. The method of claim 18, wherein the lookup table is also populated based on a predetermined number of steps defining a resolution of the lookup table.

20. The method of claim 19, wherein a greater number of steps can be used to detect certain crash conditions.

* * * * *